United States Patent
Ince et al.

(10) Patent No.: US 9,909,620 B2
(45) Date of Patent: Mar. 6, 2018

(54) RADIAL ROLLER CAGE WITH CENTERLINE GUIDANCE

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 57 days.

(21) Appl. No.: 15/016,728

(22) Filed: Feb. 5, 2016

(65) Prior Publication Data

US 2017/0227053 A1    Aug. 10, 2017

(51) Int. Cl.
F16C 33/46    (2006.01)
F16C 19/26    (2006.01)

(52) U.S. Cl.
CPC .......... *F16C 33/4676* (2013.01); *F16C 19/26* (2013.01)

(58) Field of Classification Search
CPC ................ F16C 33/467; F16C 33/4676; F16C 33/54–33/546
See application file for complete search history.

(56) References Cited

U.S. PATENT DOCUMENTS

| | | | | |
|---|---|---|---|---|
| 3,314,738 A * | 4/1967 | Schaeffler | ............ | F16C 19/305 384/578 |
| 3,586,406 A * | 6/1971 | Barr | ..................... | F16C 19/466 384/580 |
| 3,684,337 A * | 8/1972 | Fransos | ................. | F16C 19/305 384/575 |
| 5,772,338 A * | 6/1998 | Hillmann | ............ | F16C 33/4605 384/470 |
| 6,068,406 A * | 5/2000 | Yoshida | .................. | F16C 19/46 384/470 |
| 6,203,205 B1 * | 3/2001 | Murai | ..................... | F16C 19/26 384/450 |
| 6,969,202 B2 * | 11/2005 | Kackowski | ............. | F16C 19/44 384/580 |
| 8,092,097 B2 * | 1/2012 | Ohashi | .................... | F16C 19/46 384/470 |
| 8,465,209 B2 * | 6/2013 | Claus | ...................... | F16C 33/46 384/572 |
| 9,593,714 B1 * | 3/2017 | Ince | .................... | F16C 33/4676 |
| 2011/0091144 A1 * | 4/2011 | Oishi | .................... | F16C 33/546 384/548 |

* cited by examiner

*Primary Examiner* — Thomas R Hannon
(74) *Attorney, Agent, or Firm* — Volpe and Koenig, P.C.

(57) ABSTRACT

A cage for a radial bearing assembly with rolling elements is provided. The cage includes a first and second rims, and webs extend between the rims to define pockets that receive rolling elements. Each of the webs includes first and second rolling element guide surfaces that face a first adjacent one of the pockets and third and fourth guide surfaces that face a second adjacent one of the pockets. These guide surfaces are located at a pitch circle adapted to coincide with a centerline of the rolling elements located in the pockets. The webs have first and second radially inner retention tabs that respectively face the first and second adjacent ones of the pockets. The first retention tab is located axially between the first and second guide surfaces and the second retention tab is located axially between the third and fourth guide surfaces. The retention tabs are located radially inside the pitch circle.

10 Claims, 3 Drawing Sheets

RADIAL ROLLER CAGE WITH CENTERLINE GUIDANCE

FIELD OF INVENTION

The present invention relates to a bearing assembly, and is more particularly related to a cage for a radial bearing assembly.

BACKGROUND

Bearing assemblies are used in a variety of applications. One type of known bearing assembly is a radial bearing, which includes rolling elements in the form of cylindrical rollers, with a cage to guide the cylindrical rollers as they roll between an inner bearing ring or shaft and an outer bearing ring. FIGS. 1-3 show the configuration of one known radial cage 10 that retains rollers 12 in a radial rolling bearing with inner retention. This allows the rollers 12 to rotate freely within the pocket 24 formed between two axially spaced apart rims 14, 16 and webs 18 that connect these rims 14, 16. The cage inner retention is provided by radially inner retention tabs 20a, b, c, d, that extend from the webs 18 in the circumferential direction. These tabs 20a, b, c, d are located between a centerline of the pockets 24, which corresponds to a centerline CL of the rollers 12 when they are centered in the pockets 24 and a contact area with the inner bearing ring. Here, the cage inner retention tabs 20a, b, c, d contact the rollers 12 at a small circular segment height from the bottom of the rollers 12 where they contact the inner ring and fail to provide proper guidance for the roller within the pocket 24. Outer retention is provided by tabs 22. Proper guidance of a roller 12 along its length is crucial to prevent the roller 12 from skewing. However, this known inner retention allows the roller ends to not be contained within the pocket 24, permitting skewing by pivoting of the rollers 12 as shown in FIG. 3, where the roller 12 has been able to lift up out of the inner retention area and pivot out of alignment with the pocket 24 centerline. In these know arrangements, skewing is in the range of plus or minus two degrees. Skewing can cause the overall bearing assembly to walk in an axial direction and also allow the rollers 12 to drill into the cage 10 at the end of the pocket 24. This can result in cage failure as well as debris being generated due to the drilling into the cage 10 which can lead to spalling and ultimately failure of the bearing.

It would be desirable to provide a cage with improved rolling element guidance and retention elements that further reduce skewing of the cylindrical rollers within the pockets of the bearing cage, and provide increased strength at the connection area between the webs and the rings.

SUMMARY

Briefly stated, a cage for a radial bearing assembly with rolling elements is provided. The cage includes a first circumferentially extending rim including a first flange as well as a circumferentially extending rim including a second flange. A plurality of webs extend axially between the first and second circumferentially extending rims to define a plurality of pockets adapted to receive the rolling elements. Each of the plurality of webs includes first and second rolling element guide surfaces that face a first adjacent one of the pockets and third and fourth rolling element guide surfaces that face a second adjacent one of the pockets. The first, second, third, and fourth rolling element guide surfaces are located at a pitch circle adapted to coincide with a centerline with the rolling elements when they are located in the pockets. Each of the plurality of webs has first and second radially inner retention tabs that respectively face the first and second adjacent ones of the pockets. The first radially inner retention tab is located axially between the first and second guide surfaces and the second radially inner retention tab is located axially between the third and fourth guide surfaces. The first and second radially inner retention tabs are located radially inside of the pitch circle. Preferably, the first, second, third, and fourth rolling element guide surfaces that are located at the pitch circle and adapted to contact the rolling elements at the centerlines thereof. This arrangement provides proper guidance for the rolling elements to prevent skewing and also provides the best contact for the rolling elements to push the cage around as the bearing rotates.

Preferably, the length of the first and second guide surfaces is less than the length of a first radially inner retention tab. This reduces friction while providing optimum guidance due to the location of the guide surfaces at the axial ends of the rolling elements.

In one arrangement of the cage, the first and second flanges extend radially outwardly. However, these flanges could also extend radially inwardly.

Preferably, the total length of the first and second guide surfaces along one web is less than 25% of the length of the pocket, which generally corresponds to a length of a rolling element, with the difference being the axial end clearances.

In another aspect, a radial bearing assembly is provided. This includes a radially outer race along with a plurality of cylindrical rolling elements. A cage as described above is provided and the rolling elements are located in the pockets. The first and second radially inner retention tabs provide inner retention for the rolling elements while the radially outer race provides outer retention. The guide surfaces ensure the proper alignment of the rolling elements in the cage in order to prevent skewing of the rolling elements, which can lead to failure of the bearing.

Preferably, the cage in accordance with the present invention provides a reduction of skewing to less than plus or minus one half of a degree, which provides for higher reliability and longer bearing life in comparison with the cage according to the prior art as shown in FIGS. 1-3 where skewing is in the range of plus or minus two degrees.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
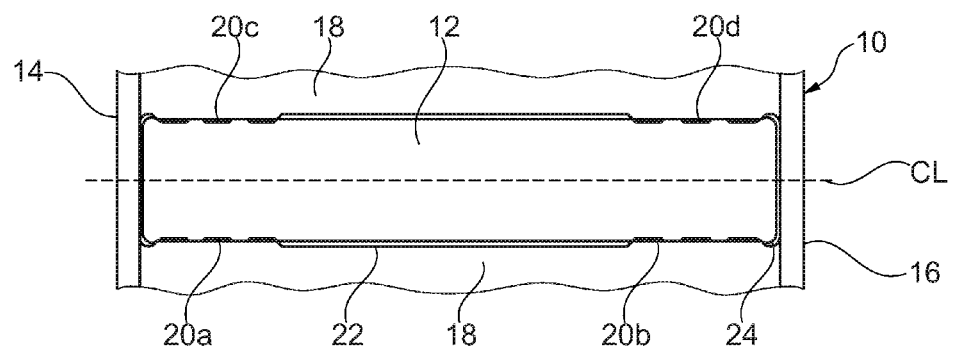
FIG. 1 is a view looking radially inward at a cage for a radial rolling bearing in accordance with the prior art illustrating a portion of the cage and a rolling element.
Figure 2:
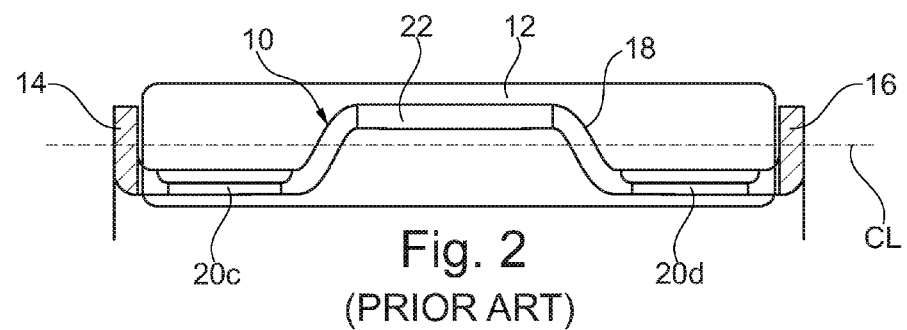
FIG. 2 is a cross-sectional view of the prior art radial roller bearing cage shown in FIG. 1.
Figure 3:
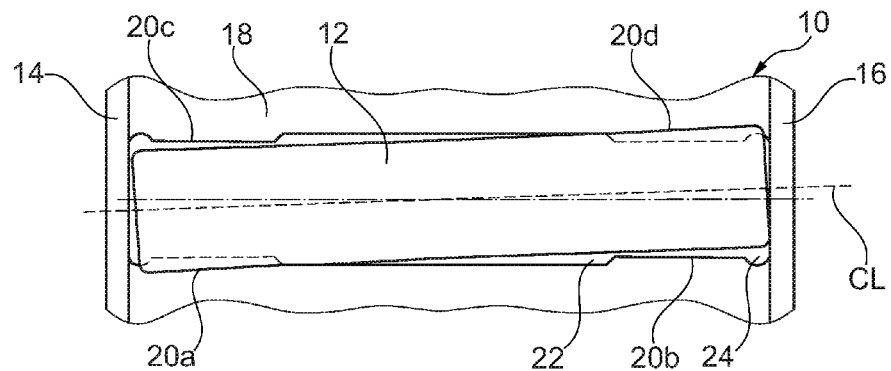
FIG. 3 is a view looking radially inward at a cage in accordance with the prior art as shown in FIG. 1, showing skewing of the rolling element in the pocket.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. "Radially" refers to a direction perpendicular to an axis. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 4:
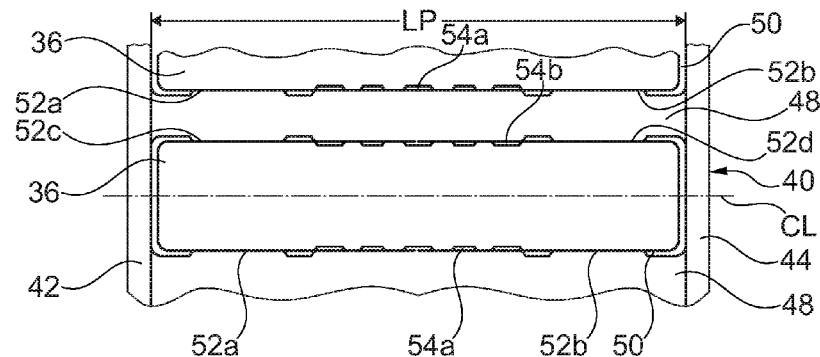
FIG. 4 is a view looking radially inward at a portion of a cage for a radial rolling bearing in accordance with a first embodiment.
Figure 5:
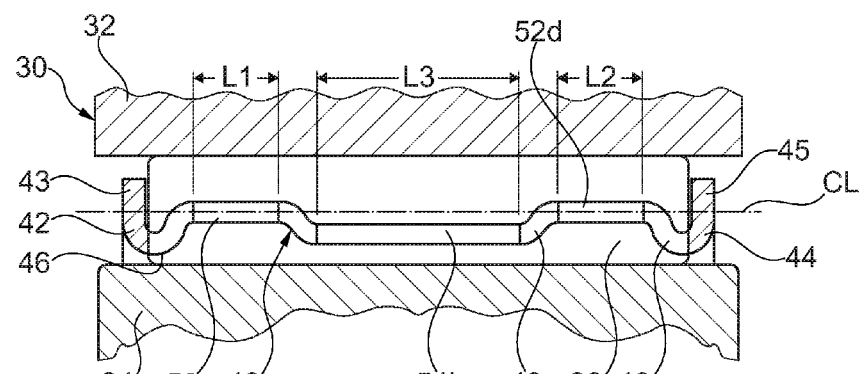
FIG. 5 is a cross-sectional view through the cage shown in FIG. 4.

Referring to FIGS. 4 and 5, a first embodiment of a radial bearing assembly 30 is shown. These Figures illustrate a portion of the bearing assembly 30, and as understood by those of ordinary skill in the art, the bearing would include the illustrated structure extending 360° about the bearing axis. The bearing assembly 30 includes the outer ring 32, preferably in the form of a cup. The radial bearing assembly 30 is adapted to be placed directly on a shaft indicated at 34 or may include a separate inner ring such that the overall bearing assembly includes both the outer ring 32 as well as an inner ring. Rolling elements 36 are located within the outer ring 32 and also ride on the shaft 34 or inner ring, if provided. The rolling elements 36 are preferably cylindrical rollers and are spaced apart in the circumferential direction by a cage 40.

Still with reference to FIGS. 4 and 5, the cage 40 includes a first circumferentially extending rim 42 that has a first flange 43. It also includes a second circumferentially extending rim 44 having a second flange 45. A plurality of webs 48, two of which are shown in FIG. 4 extend axially between the first and second circumferentially extending rims 42, 44 to define a plurality of pockets 50 that are adapted to receive the rolling elements 36. Each of the plurality of webs 48 includes first and second rolling element guide surfaces 52a, 52b that face a first adjacent one of the pockets 50, and third and fourth rolling element guide surfaces 52c, 52d that face a second adjacent one of the pockets 50, as shown in detail in FIG. 4. The first, second, third and fourth rolling element guide surfaces 52a-52b are located at a pitch circle of the rolling elements 36 and are adapted to coincide with a center line, indicate at CL of the rolling elements 36. Each of the plurality of webs 48 further includes first and second radially inner retention tabs 54a, 54b that respectively face the first and second adjacent ones of the pockets 50. The first radially inner retention tab 54a is axially located between the first and second rolling element guide surfaces 52a, 52b, and the second radially inner retention tab 54b is located axially between the third and fourth rolling element guide surfaces 52c, 52d. The first and second radially inner retention tabs 54a, 54b are located radially inside of the pitch circle, as seen in FIG. 5, to provide inner retention. Preferably, the first, second, third and fourth rolling element guide surfaces 52a-52d are located at the pitch circle and are adapted to contact rolling elements 36 at centerlines thereof. By placing these rolling element guide surfaces 52a-52d at the axial ends of the rolling elements 36, a more precise guidance of the rolling elements 36 is provided, reducing or preventing possible skewing in comparison with the prior art cage 10 described above. Here, based on the minimal clearances between the rolling element guide surfaces 52a-52d and a diameter of the rolling elements 36, which can be in the range of 0.00394 mm (0.010 inches), the skewing is significantly limited.

In order to reduce friction, the lengths of the first and second rolling element guide surfaces 52a, 52b, indicated as L1 and L2 in FIG. 5 with L1 corresponding to the length of both the first and third rolling element guide surfaces 52a, 52c and L2 corresponding to a length of both the second and fourth rolling element guide surfaces 52b, 52d, the total of L1 plus L2 is less than a length of the first radially inner retention tab 54a, indicated as L3 in FIG. 5. Here L3 corresponds to the length of both the first radially inner retention tab 54a as well as the second radially inner retention tab 54b. This arrangement allows for optimum retention in the inner direction due to the increased length of the first and second radially inner retention tabs 54a, 54b in comparison to the prior art while providing for improved guidance based on the positioning of the guide surfaces 52a-52b at the axial ends of the rolling elements 36.

As shown in FIG. 5, preferably the first and second flanges 43, 45 extend radially outwardly. However, in an alternate embodiment shown in FIG. 6, which includes the first and second circumferentially extending rims 42', 44', the first and second flanges 43', 45' can also extend radially inwardly. In either case, the height of the flanges 43, 45, 43', 45' is less than a diameter of the rolling elements 36. The guide surfaces 52a'-52d' and the radially inner retention tabs 54a', 54b' correspond to the same parts as described in connection with the first embodiment shown in FIGS. 4 and 5.

Still with reference to FIG. 5, a total length of the first and second guide surfaces (L1 plus L2) is preferably less than 25% of a length of the pocket LP. The length of the pocket LP roughly corresponds to the length of the rolling elements 36 which are slightly shorter based on the axial end clearances provided, and this reduced contact area reduces friction between rolling elements 36 and the cage 40.

As shown in FIG. 5, the first and second flanges 43, 45 are preferably J-shaped in cross-section with a radially inwardly formed curve section 46 and a radially outwardly directed free end. Alternatively, as shown in the embodiment of FIG. 6, the first and second flanges 43', 45' can also be J-shaped in cross-section with a radially outwardly formed curve section 46' and radially inwardly directed free end.

The cage 40, 40' can be formed of a metallic or polymeric material. The polymeric material can be molded. Alternatively, a metallic material can be punched and bent into a ring-shape form and the ends joined together to form a circular cage.

The cage 40 can be provided alone or assembled in a bearing assembly including at least the outer ring 32 and rolling elements 36 which are retained between the outer ring 32 and the radially inner retention tabs 54a, 54b on the cage 40. This is preferred for bearings 30 that are installed directly on a shaft, with the outer surface of the shaft acting as the inner bearing race. Optionally an inner ring can be provided that acts as the inner bearing race.

Figure 6:
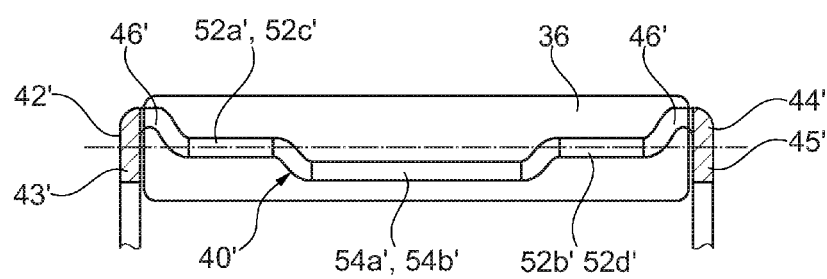
FIG. 6 is a cross-sectional view similar to FIG. 5 showing a second embodiment of a cage.

With respect to FIG. 6, here this alternate embodiment of the cage 40' is the same as the cage 40 shown in FIG. 5 except that the flanges 43', 45' include the radially inwardly directed free ends.

Figure 7:
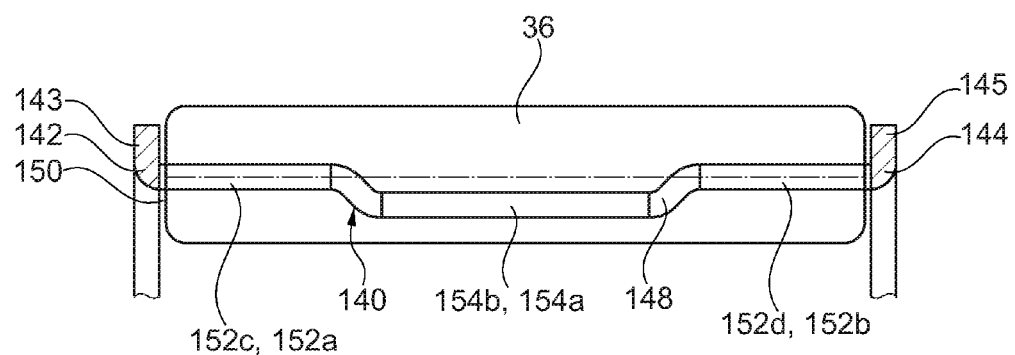
FIG. 7 is a cross-sectional view similar to FIG. 5 showing a third embodiment of a cage.
Figure 8:
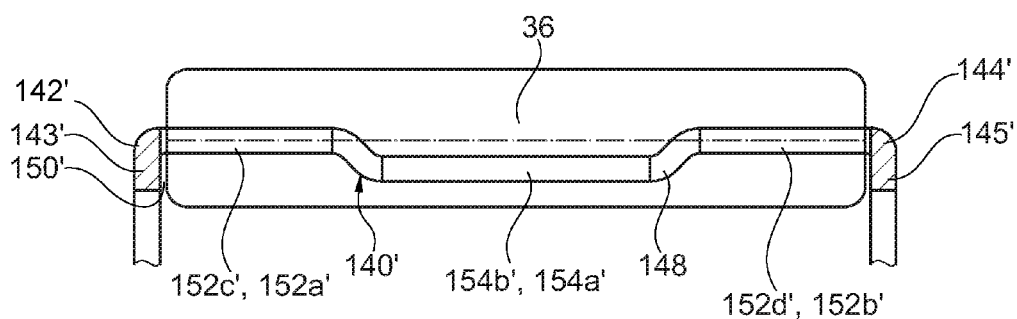
FIG. 8 is a cross-sectional view similar to FIG. 5 showing a fourth embodiment of a cage.

Referring to FIGS. 7 and 8, two additional embodiments of the cage 140, 140' are shown. Here, the cages 140, 140' include first and second circumferentially extending rims 142, 144; 142', 144' defining pockets 150, 150', respectively, and the webs 148 extend directly to the first and second flanges 143, 145 in FIGS. 7 and 143' and 145' in FIG. 8. In FIG. 7, these flanges 143, 145 are directed radially outwardly, while in FIG. 8, the flanges 143', 145' are directed radially inwardly. The cages 140, 140' include extended rolling element guide surfaces 152a-152d; 152a'-152d' that correspond to the same parts discussed in connection with the first embodiment shown in FIGS. 4 and 5 as well as radially inner retention tabs 154a, 154b; 154a', 154b'.

In order to reduce friction, the actual contact length of the guide surfaces with the rolling elements 36 can be adjusted through providing increased clearances at least in a partial area.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A cage for a radial bearing assembly with rolling elements, the cage comprising:
    a first circumferentially extending rim including a first flange;
    a second circumferentially extending rim including a second flange;
    a plurality of webs extending axially between the first and second circumferentially extending rims to define a plurality of pockets adapted to receive the rolling elements, each of the plurality of webs including first and second rolling element guide surfaces that face a first adjacent one of the pockets, and third and fourth rolling element guide surfaces that face a second adjacent one of the pockets, the first, second, third, and fourth rolling element guide surfaces being located at a pitch circle of the rolling elements to be received in the pockets, and each of the plurality of webs having first and second radially inner retention tabs that respectively face the first and second adjacent ones of the pockets, with the first radially inner retention tab being located axially between the first and second rolling element guide surfaces and the second radially inner retention tab being located axially between the third and fourth rolling element guide surfaces, and the first and second radially inner retention tabs are located radially inside of the pitch circle, wherein the first and second flanges are each J-shaped in cross-section with:
    a radially inwardly formed curve section and a radially outwardly directed free end; or,
    a radially outwardly formed curve section and a radially inwardly directed free end.

2. The cage of claim 1, wherein the first, second, third and fourth rolling element guide surfaces are located at the pitch circle and are adapted to contact the rolling elements at centerlines thereof.

3. The cage of claim 1, wherein a combined length of the first and second guide surfaces is less than a length of the first radially inner retention tab.

4. The cage of claim 1, wherein the first and second flanges extend radially outwardly.

5. The cage of claim 1, wherein the first and second flanges extend radially inwardly.

6. A radial bearing assembly comprising:
    a radially outer ring;
    a plurality of cylindrical rolling elements; and
    a cage including a first circumferentially extending rim including a first flange, a second circumferentially extending rim including a second flange, and a plurality of webs extending axially between the first and second circumferentially extending rims to define a plurality of pockets that receive the rolling elements, each of the plurality of webs including first and second rolling element guide surfaces that face a first adjacent one of the pockets and third and fourth rolling element guide surfaces that face a second adjacent one of the pockets, the first, second, third, and fourth rolling guide surfaces being located at a pitch circle that coincides with a centerline of the rolling elements, and each of the plurality of webs having first and second radially inner retention tabs that respectively face the first and second adjacent ones of the pockets, with the first radially inner retention tab being located axially between the first and second rolling element guide surfaces and the second radially inner retention tab being located axially between the third and fourth rolling element guide surfaces, and the first and second radially inner retention tabs are located radially inside of the pitch circle, wherein the rolling elements are retained by the first and second radially inner retention tabs and the radially outer race, and the first and second flanges are each J-shaped in cross-section with:
    a radially inwardly formed curve section and a radially outwardly directed free end; or,
    a radially outwardly formed curve section and a radially inwardly directed free end.

7. The radial bearing assembly of claim 6, wherein the first, second, third and fourth rolling element guide surfaces are located at the pitch circle and are adapted to contact the rolling elements at centerlines thereof.

8. The radial bearing assembly of claim 6, wherein a combined length of the first and second guide surfaces is less than a length of the first radially inner retention tab.

9. The radial bearing assembly of claim 6, wherein the first and second flanges extend radially outwardly.

10. The radial bearing assembly of claim 6, wherein the first and second flanges extend radially inwardly.

* * * * *